United States Patent
Chen et al.

(10) Patent No.: US 9,177,370 B2
(45) Date of Patent: Nov. 3, 2015

(54) SYSTEMS AND METHODS OF ADVANCED SITE-BASED NANOTOPOGRAPHY FOR WAFER SURFACE METROLOGY

(71) Applicant: KLA-Tencor Corporation, Milpitas, CA (US)

(72) Inventors: Haiguang Chen, Mountain View, CA (US); Sergey Kamensky, Campbell, CA (US); Jaydeep Sinha, Livermore, CA (US); Pradeep Vukkadala, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 191 days.

(21) Appl. No.: 13/779,947

(22) Filed: Feb. 28, 2013

(65) Prior Publication Data

US 2013/0236085 A1 Sep. 12, 2013

Related U.S. Application Data

(60) Provisional application No. 61/609,487, filed on Mar. 12, 2012.

(51) Int. Cl.
*G06K 9/00* (2006.01)
*G06T 7/00* (2006.01)

(52) U.S. Cl.
CPC ..... *G06T 7/0004* (2013.01); *G06T 2207/30148* (2013.01)

(58) Field of Classification Search
CPC ............ G06T 2207/30148; G06T 7/001; G06T 7/004; G01N 21/9501
USPC ........................................ 382/145
See application file for complete search history.

(56) References Cited

U.S. PATENT DOCUMENTS

| | | | | |
|---|---|---|---|---|
| 5,568,563 A * | 10/1996 | Tanaka et al. | ......... | 382/144 |
| 6,873,938 B1 * | 3/2005 | Paxton et al. | ......... | 702/188 |
| 7,383,156 B2 * | 6/2008 | Matsusita et al. | ......... | 702/183 |
| 2002/0088952 A1 * | 7/2002 | Rao et al. | ......... | 250/559.45 |
| 2006/0119849 A1 * | 6/2006 | Levey et al. | ......... | 356/419 |

OTHER PUBLICATIONS (M. Yoshise, "New Standard: Guide for Determining Nanotopography of Unpatterned Siliton Wafers for the 130 nm to 22 nm generations in High Volume Manufacturing", Semicon Japan 2009).*

(Continued)

*Primary Examiner* — Stephen R Koziol
*Assistant Examiner* — Totam Le
(74) *Attorney, Agent, or Firm* — Suiter Swantz pc llo

(57) ABSTRACT

Systems and methods for providing micro defect inspection capabilities for optical systems are disclosed. Each given wafer image is filtered, treated and normalized prior to performing surface feature detection and quantification. A partitioning scheme is utilized to partition the wafer image into a plurality of measurement sites and metric values are calculated for each of the plurality of measurement sites. Furthermore, transformation steps may also be utilized to extract additional process relevant metric values for analysis purposes.

52 Claims, 18 Drawing Sheets

(56) References Cited

OTHER PUBLICATIONS (Kevin T. Turner, "Predicting Distortions and Overlay Erors due to Wafer Deformation During Chucking on Lithography Scanners", SPIE|Journal of Micro/Nanolitography, MEMs, and MOEMS|vol. 8, Issue 4, 2009).*

(Sherief Reda, Analyzing the Impact of Process Variations on Parametric Measurements: Novel Models and Applications,IEEE, 2009).*

* cited by examiner

| 1/16 | 2/16 | 1/16 |
|---|---|---|
| 2/16 | 4/16 | 2/16 |
| 1/16 | 2/16 | 1/16 |

3x3 Gaussian Kernel

| −0.1333 | +0.0159 | −0.1333 |
|---|---|---|
| +0.0159 | +0.4696 | +0.0159 |
| −0.1333 | +0.0159 | −0.1333 |

3x3 DOG Kernel

| −0.0194 | −0.0548 | −0.0708 | −0.0548 | −0.0194 |
|---|---|---|---|---|
| −0.0548 | −0.0445 | +0.1047 | −0.0445 | −0.0548 |
| −0.0708 | +0.1047 | +0.5584 | +0.1047 | −0.0708 |
| −0.0548 | −0.0445 | +0.1047 | −0.0445 | −0.0548 |
| −0.0194 | −0.0548 | −0.0708 | −0.0548 | −0.0194 |

5x5 DOG Kernel

| −1 | −1 | −1 |
|---|---|---|
| −1 | 8 | −1 |
| −1 | −1 | −1 |

3x3 Laplace Kernel

| −1 | −3 | −4 | −3 | −1 |
|---|---|---|---|---|
| −3 | 0 | 6 | 0 | −3 |
| −4 | 6 | 20 | 6 | −4 |
| −3 | 0 | 6 | 0 | −3 |
| −1 | −3 | −4 | −3 | −1 |

5x5 Laplace Kernel

| 1 | 2 | 1 |
|---|---|---|
| −2 | −4 | −2 |
| 1 | 2 | 1 |

Sobel Horizontal Second Derivative 3x3

| 1 | −2 | 1 |
|---|---|---|
| 2 | −4 | 2 |
| 1 | −2 | 1 |

Sobel Vertical Second Derivative 3x3

| 1 | 4 | 6 | 4 | 1 |
|---|---|---|---|---|
| 0 | 0 | 0 | 0 | 0 |
| −4 | −8 | −12 | −8 | −2 |
| 0 | 0 | 0 | 0 | 0 |
| 1 | 4 | 6 | 4 | 1 |

Sobel Horizontal Second Derivative 5x5

| 1 | 0 | −2 | 0 | 1 |
|---|---|---|---|---|
| 4 | 0 | −8 | 0 | 4 |
| 6 | 0 | −12 | 0 | 6 |
| 4 | 0 | −8 | 0 | 4 |
| 1 | 0 | −2 | 0 | 1 |

Sobel Vertical Second Derivative 5x5

FIG. 5

| Filter Type | Kernel Size | Normalization Factor by Peak Magnitude Responses | Normalization Factor by Ideal Filter Point or Line Responses |
|---|---|---|---|
| DOG | 3x3 | 0.9972 | 2.1277 |
| DOG | 5x5 | 0.9306 | 1.8018 |
| Laplace | 3x3 | 0.0833 | 0.1250 |
| Laplace | 5x5 | 0.0208 | 0.0500 |
| LOG | 3x3 | 0.3333 | 0.8000 |
| LOG | 5x5 | 0.0353 | 0.1250 |
| Sobel | 3x3 | 0.0625 | 0.1250 |
| Sobel | 5x5 | 0.0156 | 0.0313 |

FIG. 7

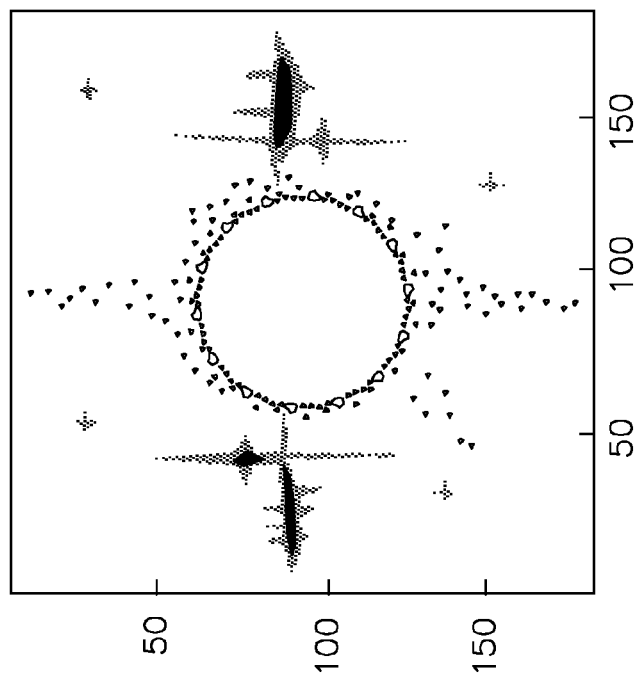
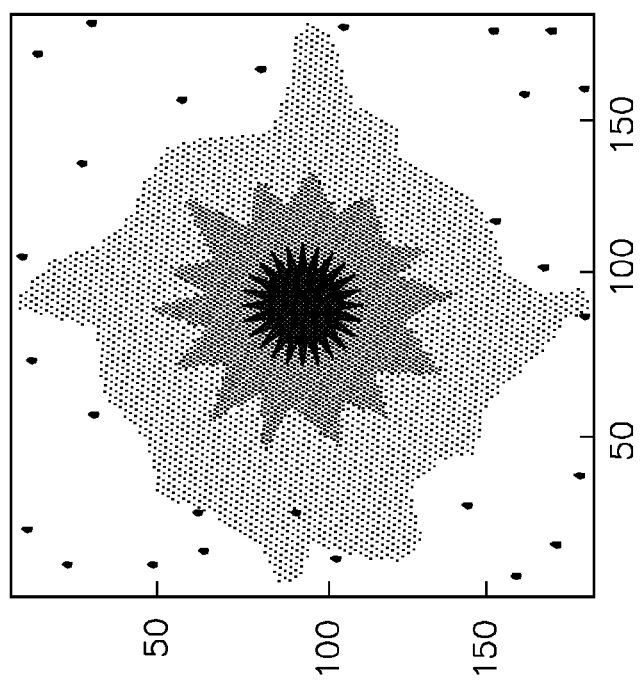
FIG. 14A
FIG. 14B

SYSTEMS AND METHODS OF ADVANCED SITE-BASED NANOTOPOGRAPHY FOR WAFER SURFACE METROLOGY

CROSS-REFERENCE TO RELATED APPLICATIONS

The present application claims the benefit under 35 U.S.C. §119(e) of U.S. Provisional Application Ser. No. 61/609,487, filed Mar. 12, 2012. Said U.S. Provisional Application Ser. No. 61/609,487 is hereby incorporated by reference in its entirety.

TECHNICAL FIELD

The disclosure generally relates to the field of wafer surface metrology, and particularly to systems and methods of advanced site-based nanotopography for wafer surface metrology.

BACKGROUND

Thin polished plates such as silicon wafers and the like are a very important part of modern technology. A wafer, for instance, may refer to a thin slice of semiconductor material used in the fabrication of integrated circuits and other devices. Other examples of thin polished plates may include magnetic disc substrates, gauge blocks and the like. While the technique described here refers mainly to wafers, it is to be understood that the technique also is applicable to other types of polished plates as well. The term wafer and the term thin polished plate may be used interchangeably in the present disclosure.

Wafer processing industries aim at integrating more circuits on a smaller chip at a lower cost with the ability to manufacture chips in large volumes with high quality and reliability to continuously improve the yield. As semiconductor technology evolves toward smaller and smaller nodes, wafer test metrology equipment is crucial to process development and to control that the wafers are in good quality. If a wafer has been damaged by previous processing steps, it is scrapped rather than undergo further processing to save money and time.

Nanotopography is defined as the deviation of a surface within a spatial wavelength of around 0.2 to 20 mm. Nanotopography bridges the gap between roughness and flatness in the topology map of wafer surface irregularities in spatial frequency. Nanotopography of the silicon wafer is dictated to a large extent by the polishing process. A true planetary, freefloating, double-sided polishing process that simultaneously polishes both sides of a silicon wafer technically achieves the required nanotopography and flatness results.

Nanotopography and flatness monitoring are critical at different steps in the wafer manufacturing process. The nanotopography and flatness of incoming bulk wafers are key parameters because of their impact on final wafer properties and wafer bond ability. Since the flatness properties of incoming 200- and 300-mm wafers undergo only minor changes during wafer processing, precise and comprehensive measurement capabilities are necessary to detect minute variations in topography on the final wafer surface.

Presently, the wafer metrology tools, such as WaferSight from KLA-Tencor, can scan both the front and back surfaces of a wafer, which is held vertically to avoid gravitational deformations. By combining wafer shape, edge roll-off, thickness or flatness, and nanotopography measurements in a single scan, the system provides complete data sets that are necessary for nanotopography and wafer geometry monitoring in wafer manufacturing. The system also performs dual-side topography measurements with high sampling resolution at the wafer edge in a single measurement.

Nanotopography data helps to close the gap between micron- and wafer-scale thickness measurements. Depending on the reference plane definition at the silicon/oxide interface, nanotopography can be linked to top-silicon thickness variations, thus providing uniformity information at the millimeter scale.

The settings of the high-pass or band-pass filters used for nanotopography measurement evaluation may significantly influence the results reported. Height maps of wafers of different nanotopography conditions recorded with an interferometric tool are processed with different filter settings in an experiment with factorial design in order to assess their influence and range of variation. Typical parameters of filter settings include filter type, filter cut-off wavelength and data extrapolation at the wafer edge. It is known that filter type, cut-off wavelength, and data extrapolation have significant impact on nanotopography measurement results. These three factors also are subject to strong interactions. A double Gaussian filter with constant 20 mm cut-off wavelength or variable cut-off wavelengths, starting from 20 mm cut-off wavelength in the wafer interior region and reducing to 1 mm in the wafer edge region are often used for providing accurate nanotopography height maps. Application of deviation metric for threshold height analysis allows the correct localization of peaks and valleys in the map and determining defective areas on a wafer.

The old method uses the Gaussian or Double Gaussian (DG) filters to process the wafer surface image and then calculate the specified metric values over the sites of the filtered images. However, the Gaussian and Double Gaussian filters have large attenuation on the signals from certain features of interest, dimple/pit, edge EPI crowns, scratch and slipline. Dimple/pit refers to surface depression. Edge EPI crowns refers to the difference between the surface elevation from the edge of the slice and that of the slice edges exposed in microns (associated with EPI layer deposition). Scratch refers to a shallow groove or cut below the established plane of the surface. Slipline refers to a process of plastic deformation in which one part of a crystal undergoes a shear displacement relative to another in a manner that preserves the crystallinity of each part of the material.

There is a large residue of low frequency shape component in the filtered image when the cutoff wavelength of the filter is long, making the old method that uses the Gaussian or Double Gaussian (DG) filters unsuitable. In addition, the response of the Gaussian and Double Gaussian filters to the wafer edge roll-off and the discontinuity created from edge exclusion also hinders the accurate identification of the wafer surface features in the wafer edge region.

Therein lies a need for systems and methods of advanced site-based nanotopography for wafer surface metrology without the aforementioned shortcomings.

SUMMARY

The present disclosure is directed to a method for inspecting a wafer. The method includes: defining a wafer partitioning scheme; obtaining a wafer surface image; filtering the wafer surface image to remove a low frequency surface components; performing wafer edge treatment on the wafer surface image to suppress a strong filter response from a sharp wafer edge roll-off or data discontinuity created by edge exclusion operation; normalizing filter response present on the wafer surface image; partitioning the wafer surface image into a plurality of measurement sites according to the wafer partitioning scheme; calculating a metric value for each of the plurality of measurement sites based on the filtered wafer surface image; and reporting the metric value calculated for each of the plurality of measurement sites in a graphical representation.

An additional embodiment of the present disclosure is also directed a method for inspecting a wafer. The method includes: defining a wafer partitioning scheme; obtaining a wafer surface image; filtering the wafer surface image to remove a low frequency surface components; performing wafer edge treatment on the wafer surface image to suppress a strong filter response from a sharp wafer edge roll-off or data discontinuity created by edge exclusion operation; normalizing filter response present on the wafer surface image; partitioning the wafer surface image into a plurality of measurement sites according to the wafer partitioning scheme; performing at least one of: Fourier transform, Cosine transform, or wavelet transform on each of the plurality of measurement sites; calculating a metric value for each of the plurality of measurement sites based on the transformed wafer surface image; and reporting the metric value calculated for each of the plurality of measurement sites in a graphical representation.

Furthermore, the wafer inspection methods in accordance with the present disclosure may be implemented using a site based measurement module of a wafer inspection system. The wafer inspection system may include an optical system configured for obtaining a wafer surface image of the given wafer. The site based measurement module may be in communication with the optical system and configured for providing the site based measurements in accordance with the present disclosure.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 5 illustrates various 3×3 filter kernels and 5×5 filter kernels for obtaining filter normalization factors;

FIG. 7 illustrates a tabular format of normalization factors for several filters;

FIG. 14A is an illustration depicting decomposed non-periodic spectrum components of the spectrum of FIG. 13;

FIG. 14B is an illustration depicting decomposed periodic spectrum components of the spectrum of FIG. 13;

DETAILED DESCRIPTION

Reference will now be made in detail to the subject matter disclosed, which is illustrated in the accompanying drawings.

The present disclosure is directed to systems and methods for providing micro defect inspection capabilities for optical systems such as wafer metrology tools and interferometer systems. Furthermore, transformation steps may also be utilized to extract additional process relevant metric values for analysis purposes, which will be described in details later.

Figure 1:
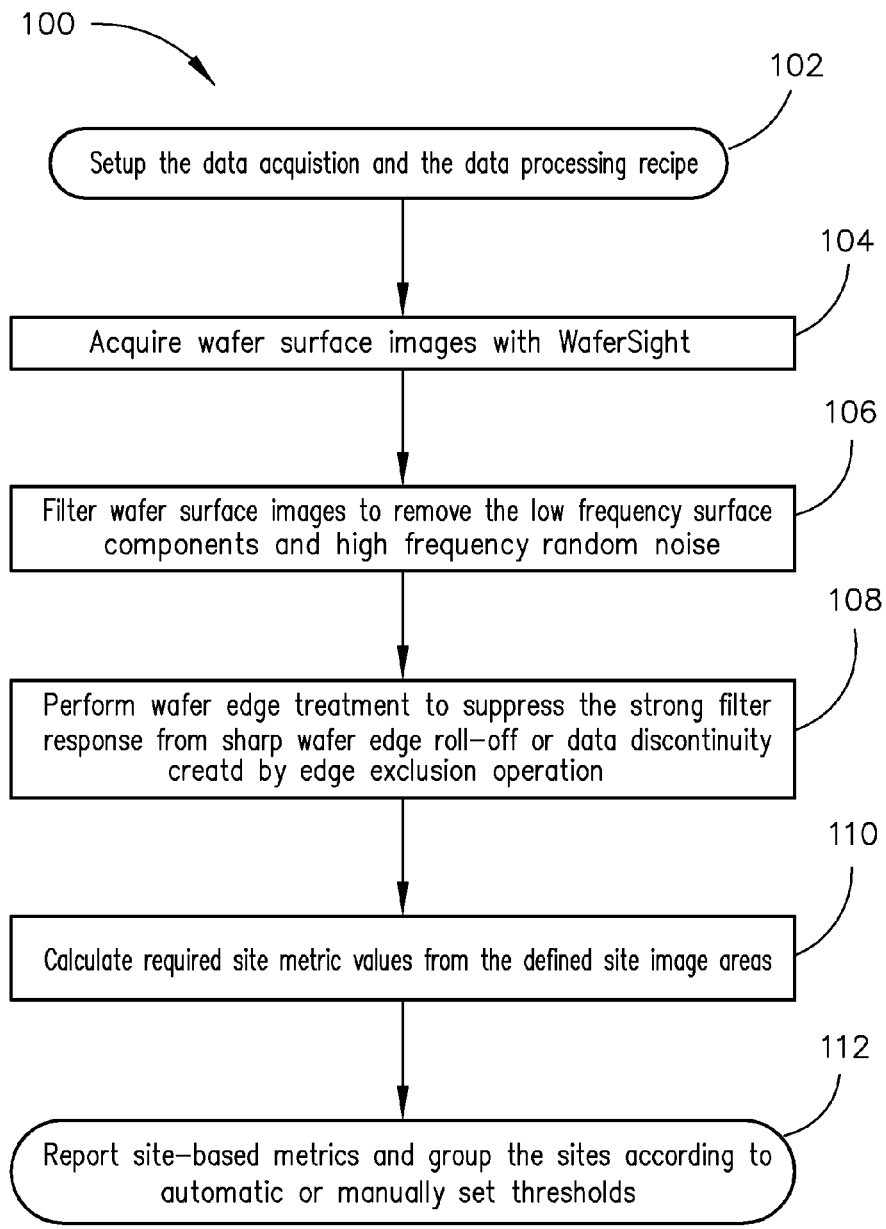
FIG. 1 is a flow diagram illustrating a site-based nanotopography method in accordance with one embodiment of the present disclosure.
Figure 2:
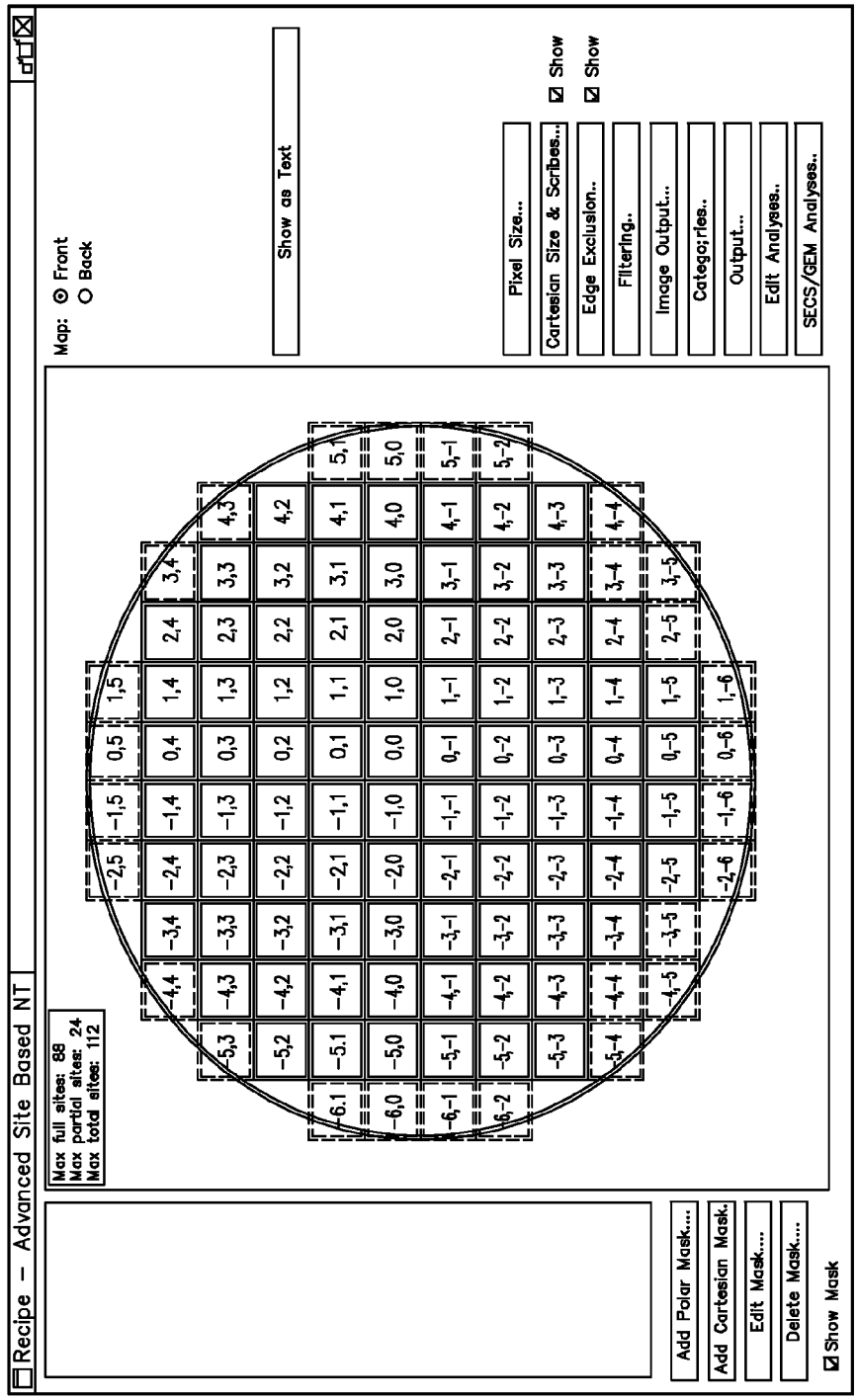
FIG. 2 is an illustration depicting an interface of recipe editor for the advanced site based nanotopography.

FIG. 1 is a flow diagram illustrating major steps of the advanced site based nanotopography for surface feature detection and quantification in accordance with one embodiment of the present disclosure. As shown in FIG. 1, data acquisition and data processing recipe is set up in step 102. FIG. 2 is an exemplary interface for setting up the data processing recipe. This exemplary interface (may be referred to as the recipe editor) allows users to setup/define various control parameters.

In one embodiment, the control parameters includes: a) "pixel size" for different pixel sizes of the surface image; b) "site array" for partitioning the wafer surface image and scribe street masking; c) "edge exclusion" for the wafer edge mask; d) "filtering" for choosing different filters used for the removal of low frequency surface components and the enhancement of the surface feature/background contrast; and e) "output" for selecting the metrics for the site based surface analysis, including, but not limited to, mean, peak, valley, PV range, root mean square (RMS) and the like.

Figure 3:
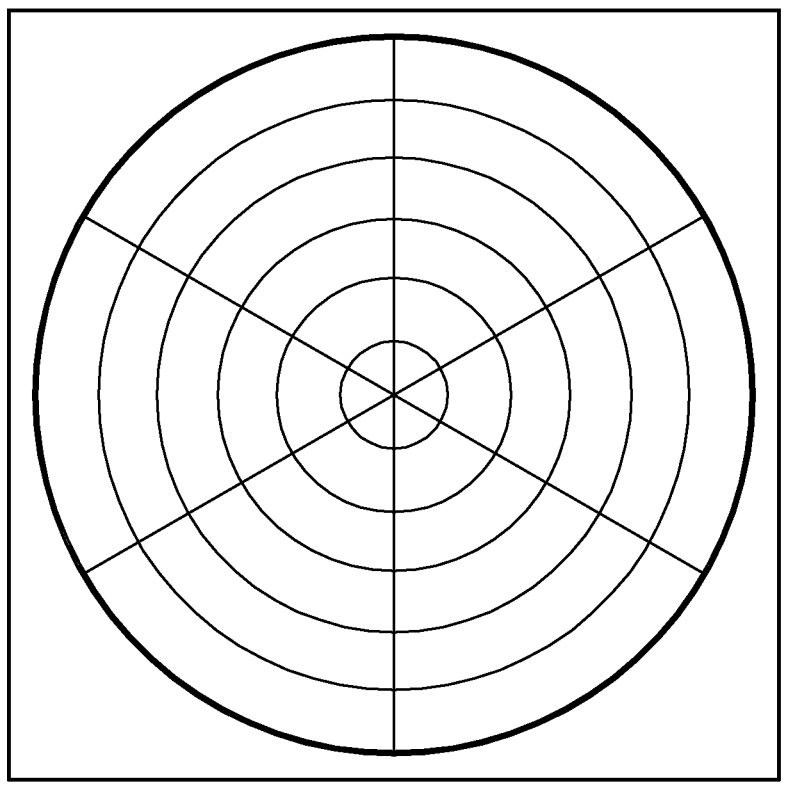
FIG. 3 is an illustration depicting a polar grid partition scheme.

It is contemplated that the recipe editor is not limited to Cartesian editing format. The measurement sites on the wafer surface can also be defined in polar format using the sector and zone, as shown in FIG. 3 for an exemplary setup of 6 sectors and 6 zones with equal radial and angular partitions. In certain situations, the polar format can generate better surface coverage for the wafer edge regions and provide more natural match with the measurements from other tools.

It is also contemplated that the "site array" for partitioning the wafer surface image and scribe street masking may be defined differently based on the coordinate system utilized. For instance, for Cartesian sites, the site width, height, and the site X/Y offsets may be specified. For polar sites, on the other hand, the number of sectors and the number of zones may be specified. In addition, for patterned wafers, the scribe streets can be masked off so that the metrics are derived from the device regions only, and both the front and/or the back wafer surfaces can be selected for street masking.

It is further contemplated that various other control parameters not specifically listed above may also be defined through the recipe editor. For instance, polar and Cartesian masks can be added through this interface to exclude certain areas of the wafer surface in the site metric calculation.

Referring back to FIG. 1, step 104 is configured to acquire the wafer surface images (e.g., the front and back surface images) using an optical system such as WaferSight. Subsequently, the surface images are filtered in step 106 using the selected filters to remove low frequency (long wavelength) surface components and high frequency random noises to boost feature signal to background contrast. It is contemplated that different filters can be selected to better match the feature shape and obtain an improved performance. For example, Laplace filter is very effective in the detection of dimple/pit and scratches, and Sobel filter may generate stronger response to the slipline features oriented in X and Y directions and thus provide better detection sensitivity. For the surface features with large magnitude, such as EPI pin marks, the DOG filter with larger kernel sizes to well cover the feature region will be more effective.

While the selected filters such as Laplace and Sobel filters can effectively remove the low frequency shape components in the wafer surface images, these filters may also have strong response in the wafer edge region due to the sharp wafer edge roll-off or the data discontinuity created by the wafer edge exclusion operation. The strong edge response may affect the detection capability of defect features in the wafer edge region, such as edge EPI crowns and sliplines. Therefore, proper edge treatment is required.

Figure 4:
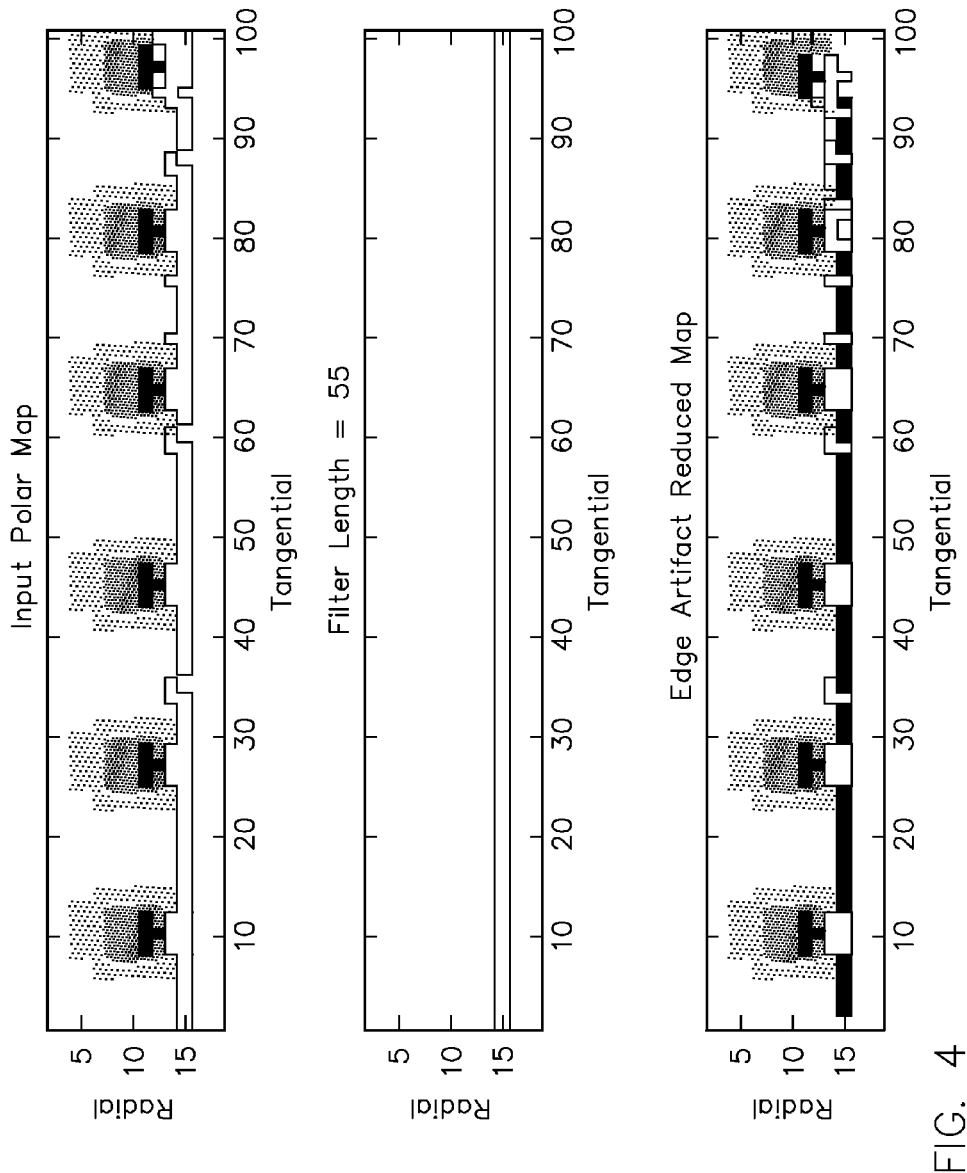
FIG. 4 illustrates exemplary mapping images for a wafer edge treatment process.

To suppress the strong filter response from the wafer edge region or from the data discontinuity created by the edge exclusion, the following edge treatment operations may be performed in step 108:

a) Convert the wafer edge region into an image band in polar space. The band height direction is the radial direction and the size in this direction is determined by the filter kernel size and the wafer roll-off profile sharpness. The band width direction is the tangential direction and the size in this direction is determined by the sampling rate in the angular direction.

b) Perform the one-dimensional median filtering on this band image along the tangential direction row by row. The filter length is selected to be able to follow the trend of the edge profile variations in the angular direction and preserve the interested edge feature in the edge treatment. Currently the filter length is defaulted to cover five degree data span. It can be adjusted according to the feature angular property for the optimal performance.

c) The filtered image is subtracted from the original image to obtain the edge response suppressed image. One segment of the original edge image, the filtered edge image and the edge artifact reduced image are shown in FIG. 4 for illustrative purposes.

d) Since the edge region usually has more noisy signals than the wafer interior region, to reduce the noise components in the edge region while preserve the feature signal, the following polarity trimmed mean may be performed on the edge treated image in the very edge region, where invalid pixels will exist due to measurement capability limit of the metrology system. That is, for the given pixel I(x,y) from the median filter edge treatment in step c), the trimmed output signal O(x, y) will be calculated as defined in:

$$O_+(x, y) = \frac{1}{N_+} \sum_{(dx,dy) \in A_+} I(x+dx, y+dy), \text{ when } I(x, y) > 0$$

$$O_-(x, y) = \frac{1}{N_-} \sum_{(dx,dy) \in A_-} I(x+dx, y+dy), \text{ when } I(x, y) < 0$$

Where, $A_+$ and $A_-$ are the positive and negative pixel sets inside the filter window, $N_+$ and $N_-$ are the numbers of the positive and negative pixels, respectively. In other words, if I(x,y)>0, then take the average of the positive pixels in the specified filter window; otherwise, if I(x,y)<0, take the average of the negative pixels in the specified filter window.

It is contemplated that this polarity trimmed mean will effectively reduce the edge noise components and preserve the signal contrast of many bipolar defect signals from EPI crowns and slipline. This helps to obtain the improved performance for defect detection and classification in the wafer edge regions. It is also contemplated, however, that the various types of filters and the filter response suppression techniques described above are exemplary. Other types of filters and noise reduction techniques may also be utilized in step 108 without departing from the spirit and scope of the present disclosure.

It is further contemplated that when certain filters are used in nanotopography, the filter response may need to be normalized. For instance, when the double Gaussian high-pass filter is used in standard nanotopography, the filter response may be normalized so that the maximum filter magnitude frequency response at the high frequency pass-band will be equal to 1.0. For Laplace, Sobel and other filters used in the advanced site based nanotopography, the filter coefficients as shown in FIG. 5 can also be normalized from their maximum magnitude frequency responses. More specifically, FIG. 5 illustrates some exemplary 3×3 filter kernels and 5×5 filter kernels for obtaining filter normalization factors, according to an embodiment of the invention. From these filter kernel coefficients as shown in FIG. 5, the frequency responses and the corresponding filter normalization factors can be obtained as shown in FIG. 6.

Figure 6A:
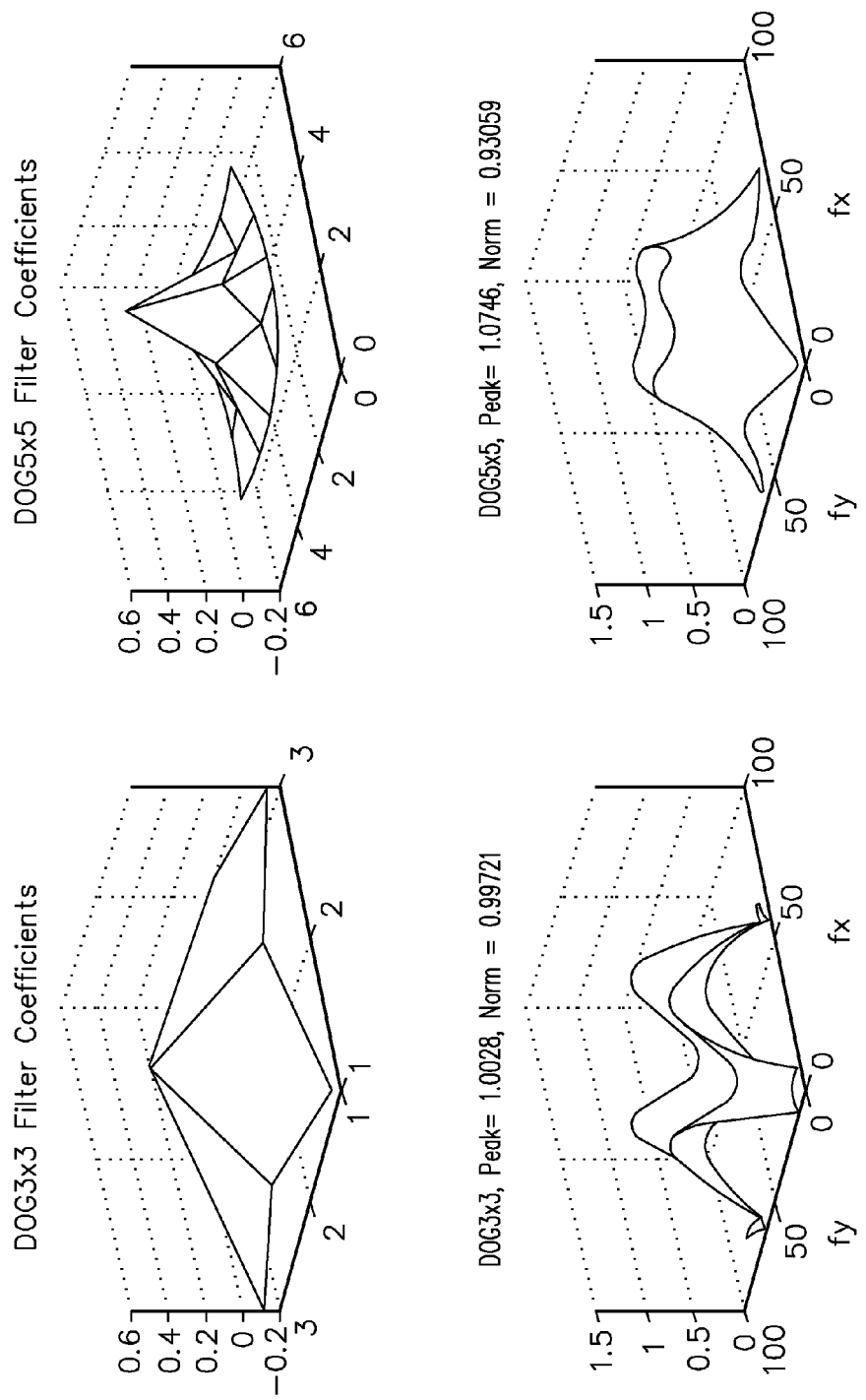
FIG. 6A illustrates spectral characteristics of the filter frequency responses and normalization factors.
Figure 6B:
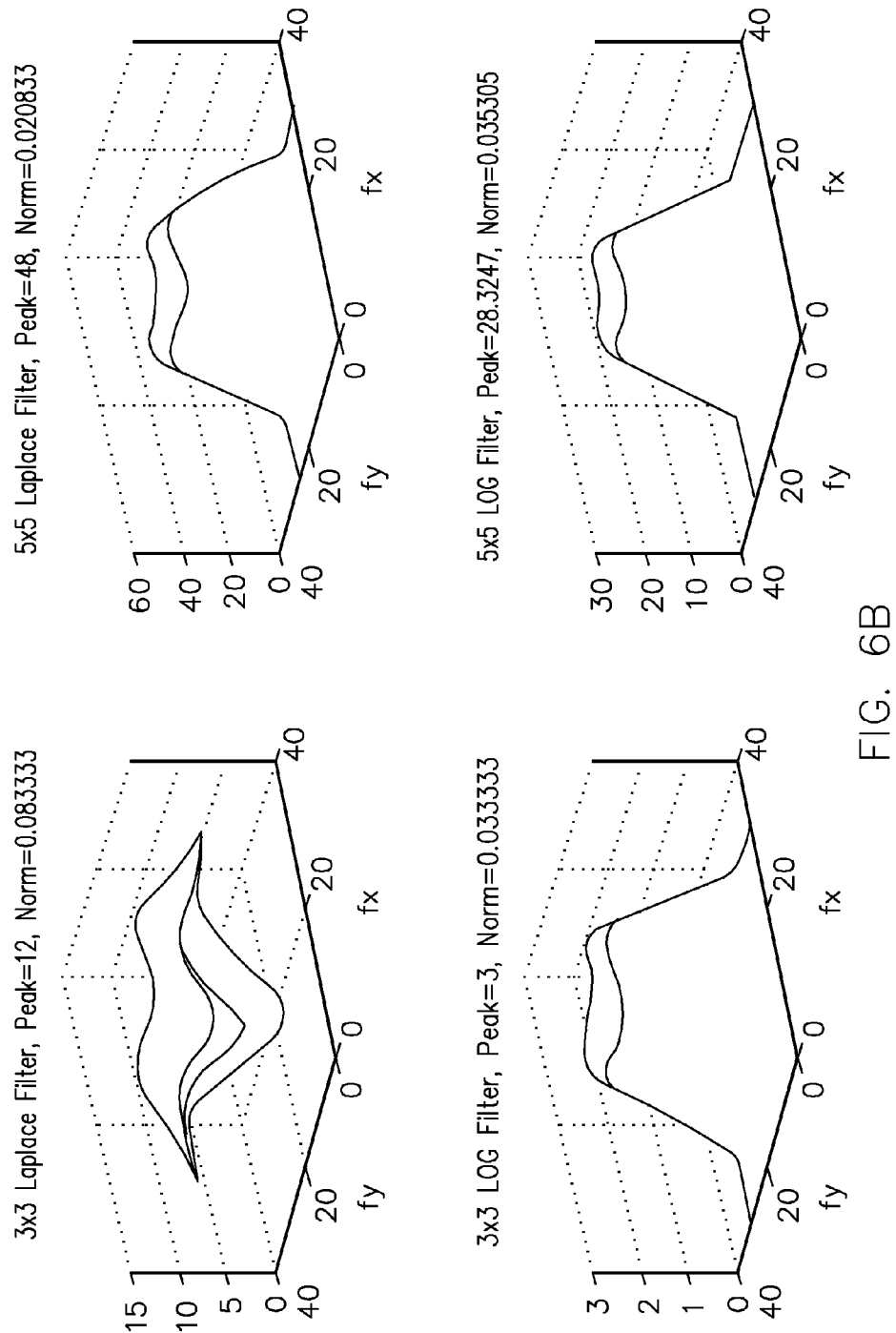
FIG. 6B illustrates spectral characteristics of the filter frequency responses and normalization factors.
Figure 6C:
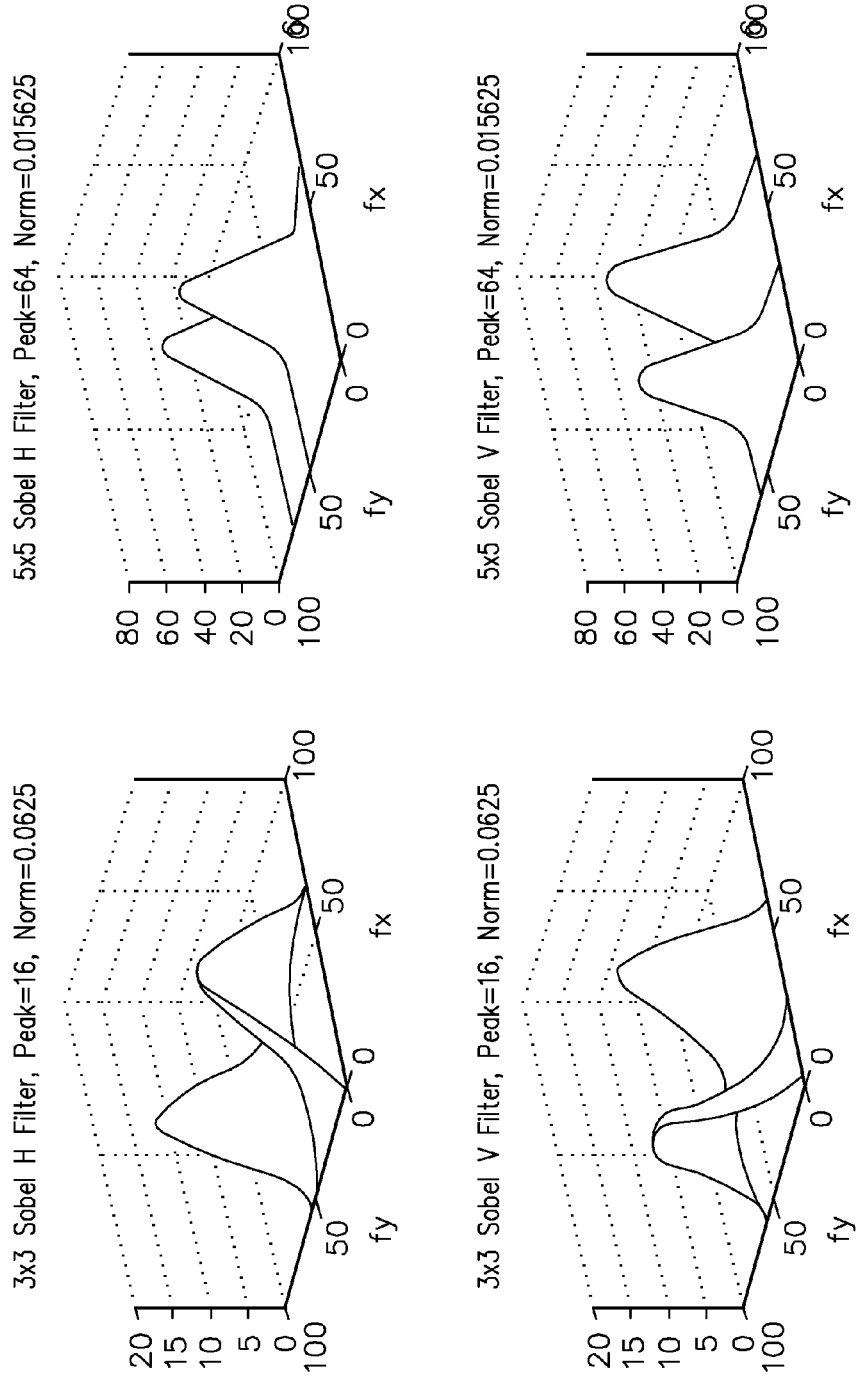
FIG. 6C illustrates spectral characteristics of the filter frequency responses and normalization factors.

FIG. 6 illustrates spectral characteristics of the filter frequency responses and normalization factors, according to an embodiment of the invention. The filter coefficients can also be normalized by their response to the point or line input signals. FIG. 7 illustrates a tabular format of normalization factors for several filters, according to an embodiment of the invention. The corresponding normalization factors derived are shown in this figure with the normalization factors calculated from the filter maximum magnitude responses.

It is noted that two approaches for the filter normalization factors generate different normalization values. The second approach based on the filter response to ideal signals produces larger normalization factors. It is noted that, in general, the applications of these filters will change the signal shape, unless the input signal is the root signal of the filter or all signal spectrum components are located inside of the filter pass-band.

Now, after filtering the input wafer surface image maps with the selected filters and performing the required wafer edge treatment followed by filter response normalization, the resulting image may then be used to calculate the various metric values in step 110. In accordance with the present disclosure, the resulting image is partitioned into a site grid and the metric values are computed for each site image region. The nanotopography provided for each site image region in accordance with the present disclosure is therefore referred to as site-based nanotopography.

Figure 8:
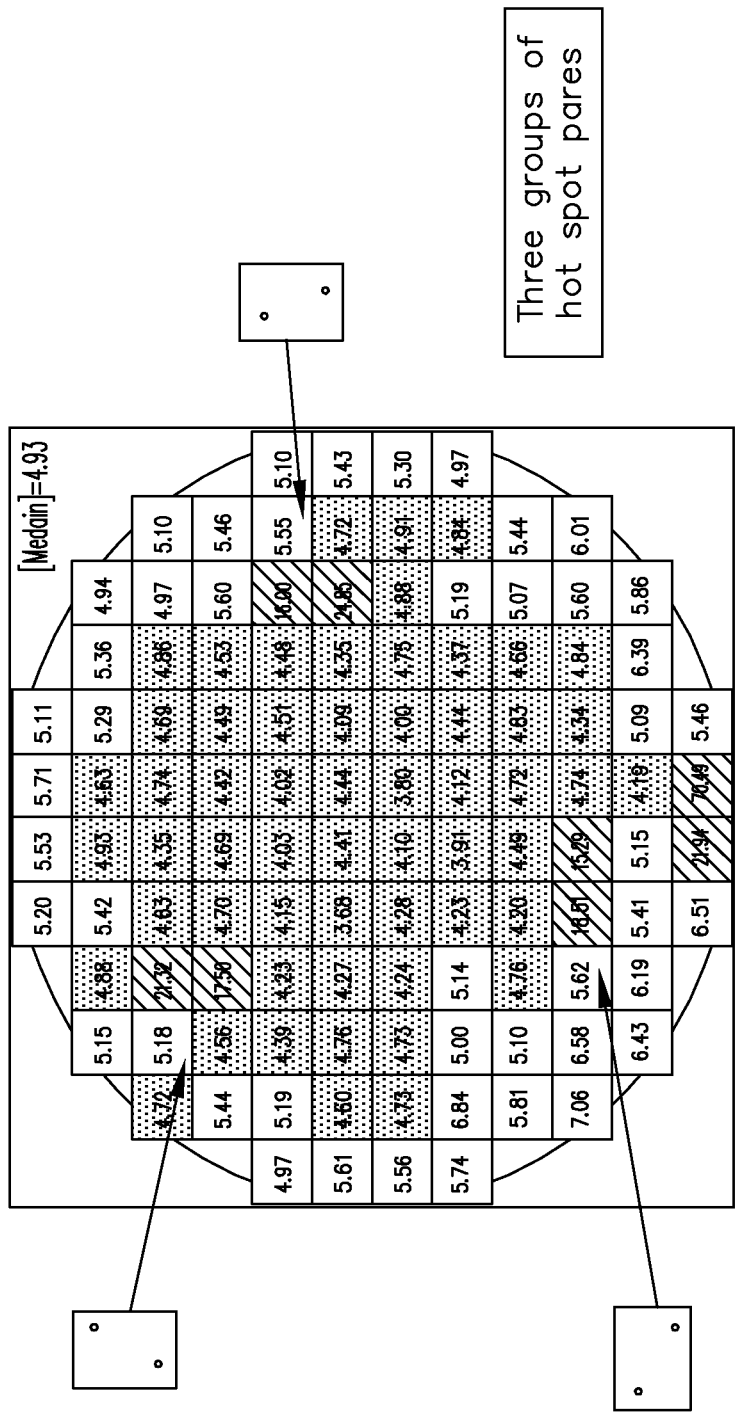
FIG. 8 is an illustration depicting a graphical representations of the site based nanotopography in accordance with the present disclosure.

It is contemplated that providing site-based nanotopography for wafer surface in accordance with the present disclosure is appreciated for various wafer analysis purposes. For instance, as illustrated in FIG. 8, a point-like feature and the site metric values is calculated and reported for each site image region. This result may be reported in step 112 to users in a graphical representation (e.g., displayed on a graphical user interface of the surface metrology tool), or it may be reported in a classification result file (e.g., a text-based or machine-readable result file) without departing from the spirit and scope of the present disclosure. In either reporting format, the metric values calculated for each site image region can be used to locate potential defects on the wafer surface. In the example depicted in FIG. 8, metric values in three regions are significantly higher than their surroundings, and they may be deemed potential defective regions.

Figure 9:
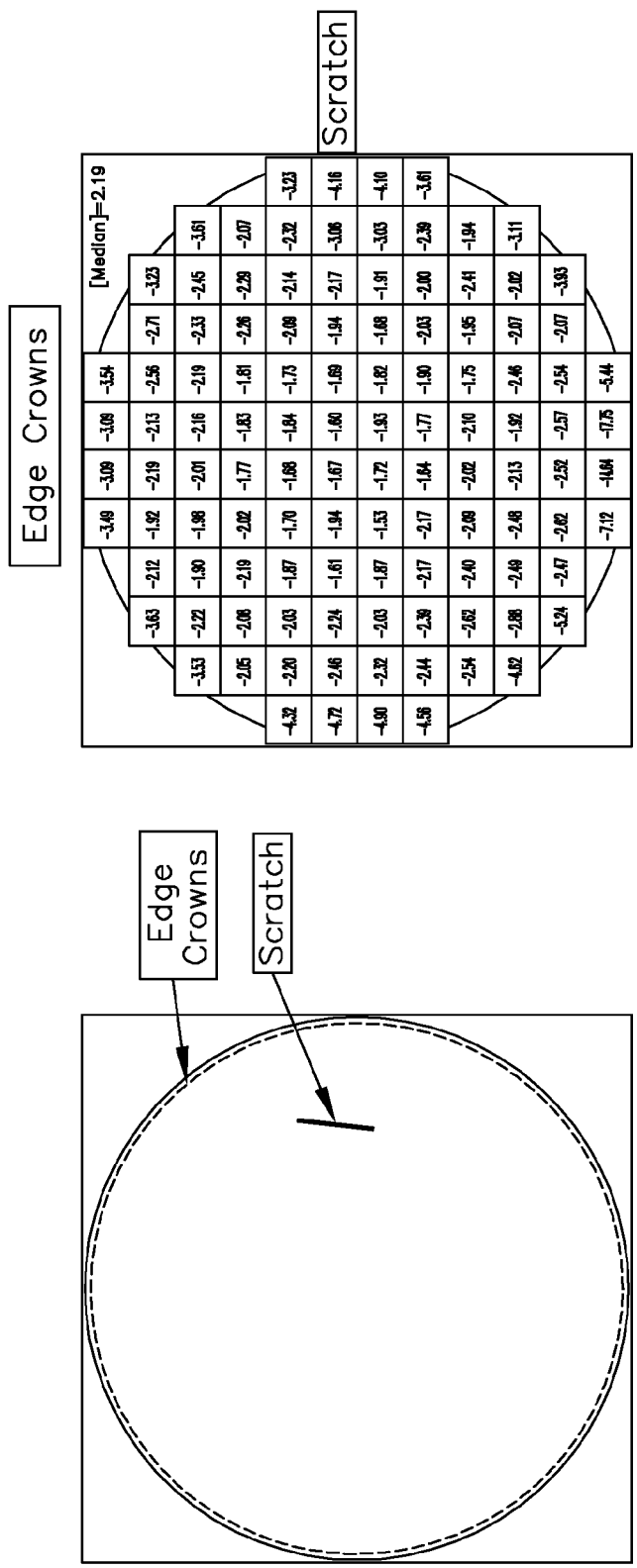
FIG. 9 is an illustration depicting wafer edge crowns and scratches and their corresponding site metric result.

Similarly, additional site-based metric values may be calculated and reported for identification of other types of potential defects. For instance, FIG. 9 illustrates site-based metric values that are suitable for identifying wafer edge EPI crowns and/or scratches. In addition, FIG. 10 illustrates site-based metric values that are suitable for identifying wafer edge sliplines.

Figure 10:
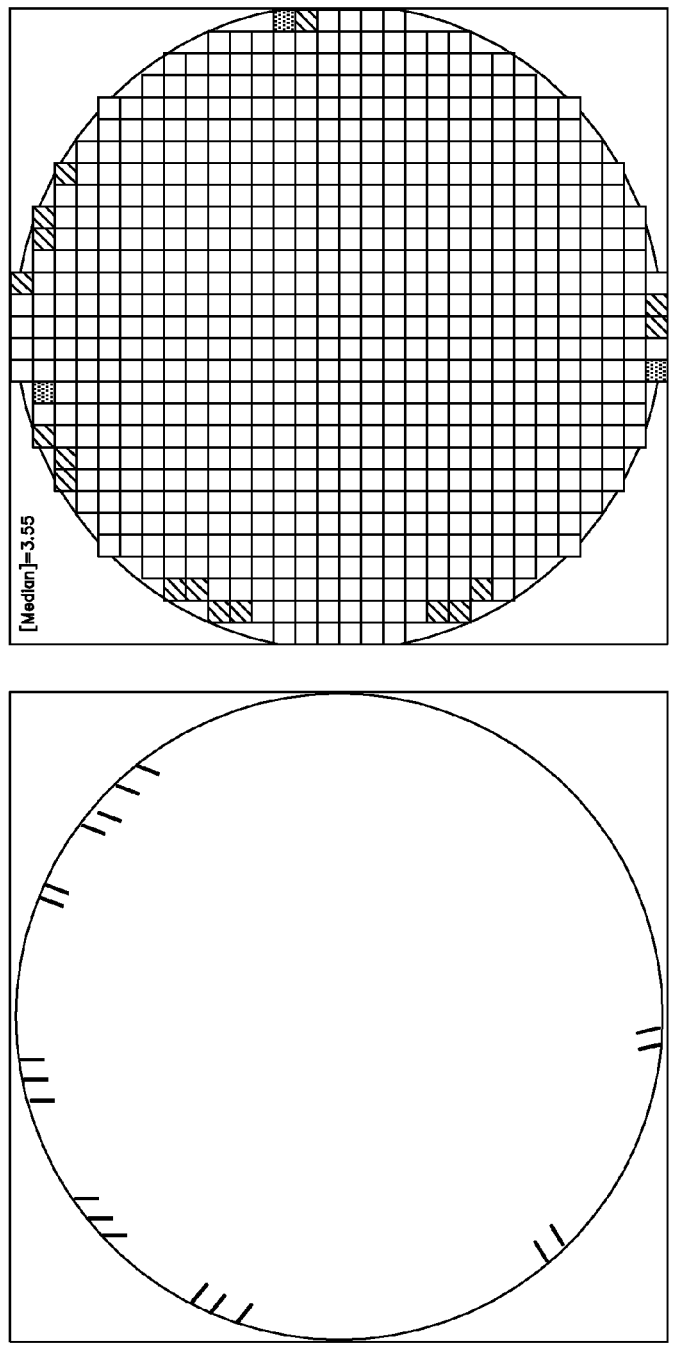
FIG. 10 is an illustration depicting sliplines and site metric result of the wafer.

As illustrated in FIGS. 8 through 10, each site image region may be shaded (or colored based on the specific implementation) according to the calculated site metric values and shading/coloring rules. For instance, a site may be shaded/colored in a first manner if its metric value is below a lower threshold, in a second manner if its metric value is between the lower threshold and an upper threshold, or in a third manner if its metric value is above the upper threshold. It is contemplated that the lower and upper thresholds may be set manually by the user to classify the sites and wafers. Alternatively, the thresholds may be determined automatically. For instance, a median value of absolute metric values of all sites may be calculated first and used as the lower threshold. The upper threshold may be defined subsequently as twice the lower threshold. It is understood, however, that utilizing two thresholds is merely exemplary. The number of thresholds utilized for grouping/classifying the measurement sites may vary without departing from the spirit and scope of the present disclosure. Furthermore, the threshold values may also be determined differently as described above.

It is contemplated that while the exemplary site grid depicted in FIGS. 8 through 10 correspond to the Cartesian editing format depicted in FIG. 2, the site grid is not limited to the Cartesian format. For instance, if the wafer surface is defined in polar format as depicted in FIG. 3, step 110 may calculate the various metric values for each site image region in the form of sectors and zones. That is, polar format may be utilized for metric values calculations and reporting purposes without departing from the spirit and scope of the present disclosure.

It is also contemplated that the types of metric values calculated in step 110 are not limited to the examples in FIGS. 8 through 10. Various types of commonly used wafer measurement metrics as well as higher order shape (HOS) characterization as disclosed in: Systems, Methods and Metrics for Wafer High Order Shape Characterization and Wafer Classification Using Wafer Dimensional Geometry Tools, Haiguang Chen et al., U.S. patent application Ser. No. 13/656,143, which is herein incorporated by reference in its entirety, may be calculated and reported in the site-based manner in accordance with the present disclosure.

Overall, the site-based nanotopography for the surface feature detection in accordance with the present disclosure provides several advantages. For instance, it uses filters with small filter kernels instead of double Gaussian high-pass filter to closely follow the wafer surface shape change and effectively remove low frequency shape components of the wafer surface image while well preserve the signal components of several important features of interest, dimple/pit, edge EPI-crowns, scratch and edge slipline. Improved signal/background contrast is also achieved for the more reliable detection of these features using the site based metrology. In addition, wafer edge treatment is applied on the filtered image to suppress strong filter responses. This edge treatment operation makes it possible to obtain the meaningful metric values from the wafer edge sites.

Furthermore, the site-based nanotopography for surface feature detection in accordance with the present disclosure normalizes the filter responses of the differential based filters by their maximum magnitude frequency responses or typical signal responses so that the filter outputs represent the surface height values directly. The process also reports and groups the site metric values of the wafer surface using automatically calculated or manually selected thresholds to identify the site regions whose metric values are outside of the specified range, effectively providing site-based feature detection.

In the description so far, all wafer surface metrics have been defined in the image spatial domain. It is contemplated that wafer surface metrics may also be defined in the image transformation domain. For instance, certain transformation steps may be utilized to extract additional process relevant metric values to provide site based surface feature frequency and scale-frequency analysis.

Figure 11:
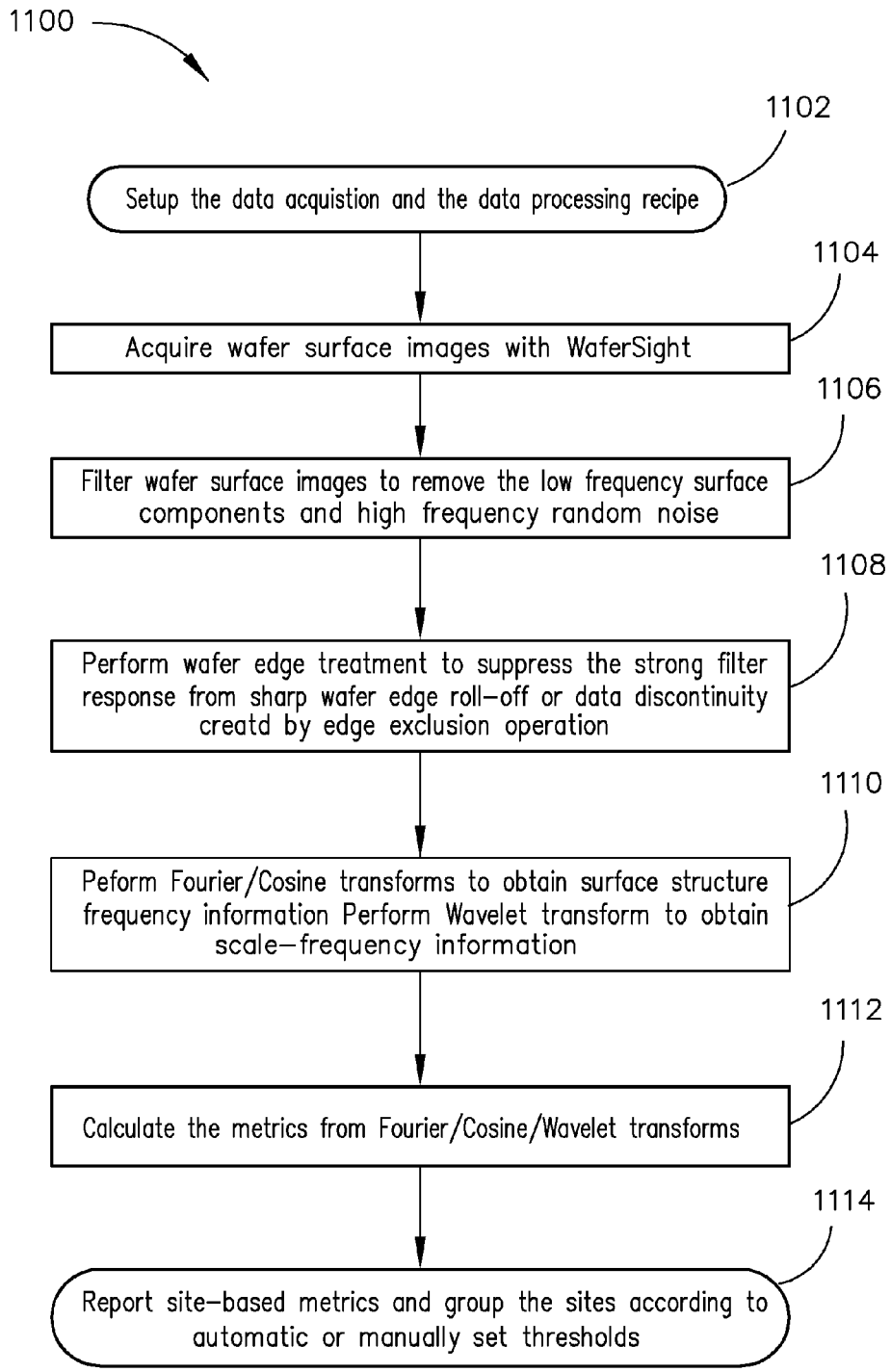
FIG. 11 is a flow diagram illustrating a site-based nanotopography method incorporating Fourier/Cosine/Wavelet transforms in accordance with one embodiment of the present disclosure.

FIG. 11 is a flow diagram illustrating major steps of the site based surface feature frequency and scale-frequency analysis in accordance with one embodiment of the present disclosure. As shown in FIG. 11, steps 1102 through 1108 are performed in a similar manner as steps 102 through 108 shown in FIG. 1. Now, instead of calculating the various metric values as indicated in step 110, step 1110 is configured to perform Fourier/Cosine transformations to obtain surface structure frequency information and/or wavelet transformations to obtain scale-frequency information. The metrics from Fourier, Cosine or wavelet transformations are calculated in step 1112 and may be subsequently reported in step 1114.

More specifically, performing the Fourier/Cosine transforms on the filtered site images can extract unique surface feature information than the existing wafer surface geometry metrics defined with the wafer surface only. While some surface features with periodic properties may have low magnitudes and are difficult to detect directly from the filtered site images, the signal characteristics are much better identifiable in the transform domain. This capability of the site based nanotopography is very useful for the characterization of wafer sawing marks, polishing marks and striation marks, and many other surface structures. Also, for the patterned wafer, the advanced nanotopography based on the transform domain analysis can generate very rich information and facilitate the feature extraction, due to the inherent periodic nature of many same devices on the wafer front surface.

Figure 12:
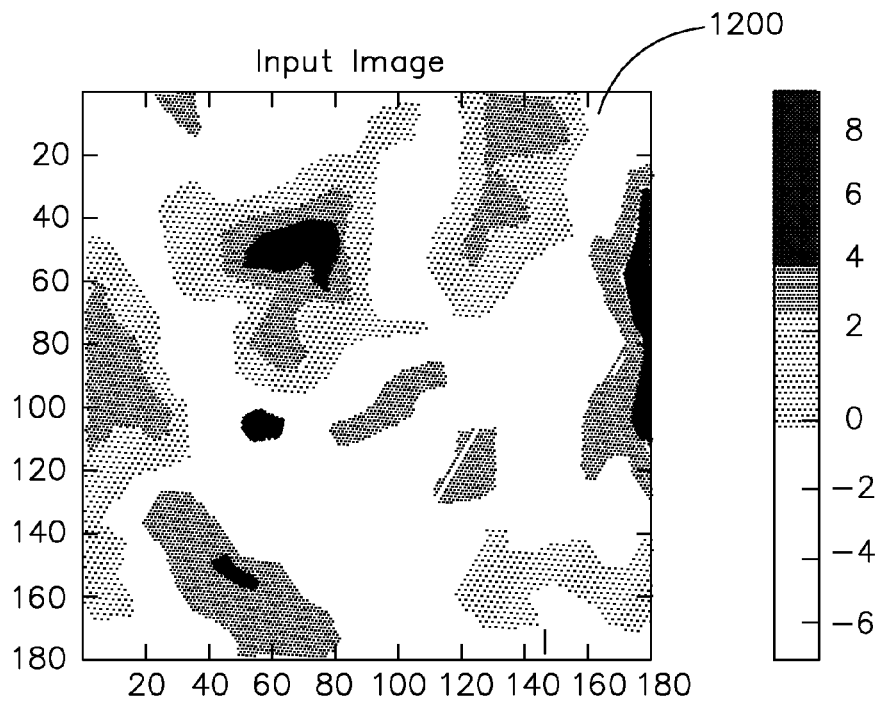
FIG. 12 is an illustration depicting a pseudo-periodic surface structure in a site image.

For example, FIG. 12 shows a site image 1200 which contains certain pseudo-periodic signal components. The magnitude of these pseudo signals have lower magnitudes than some of the low frequency surface bumps and thus may not be readily detected using the methods described in FIG. 1. However, the spectrum of this site image can be obtained by performing the Fourier transform on this site image and is shown in FIG. 13.

Figure 13:
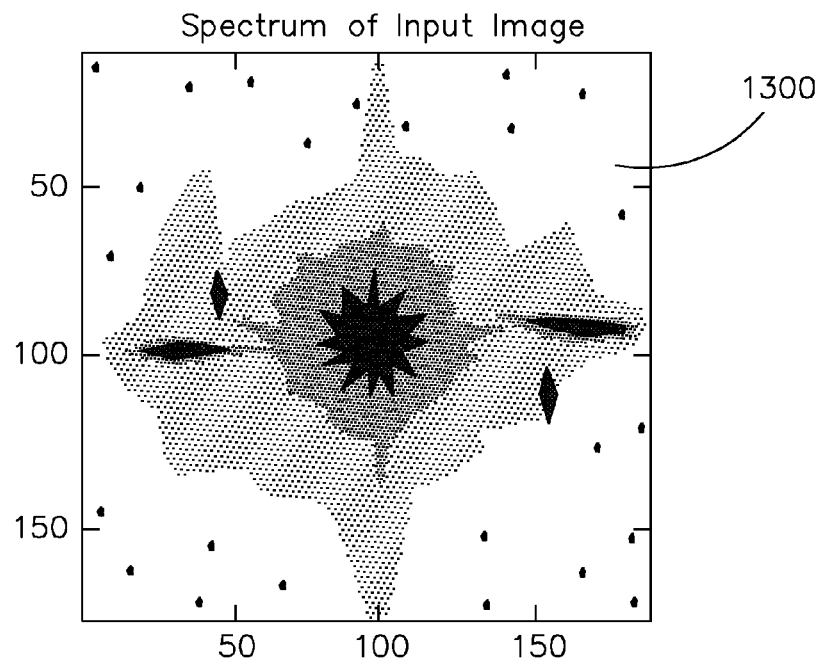
FIG. 13 is an illustration depicting the spectrum of the site image of FIG. 12.

As illustrated in FIG. 13, the spectrum 1300 of the site image 1200 clearly reveals the existence of several periodic signal components by the strong spectrum peaks. Therefore, the decomposition of the spectrum 1300 of the site image 1200 into the periodic and non-periodic components can produce rather good separation of the site image surface components.

Figures 15A, 15B:
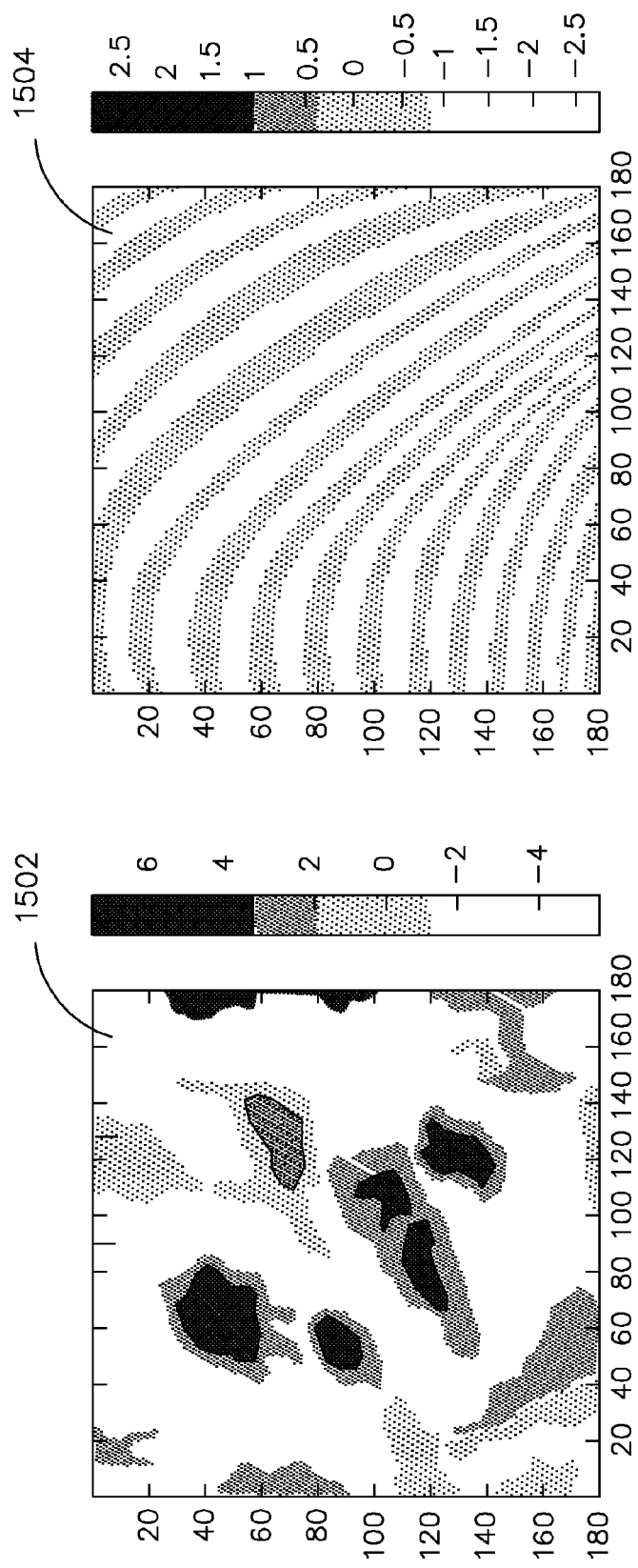
FIG. 15A is an illustration depicting non-periodic surface components obtained from spectrum decomposition.
FIG. 15B is an illustration depicting pseudo-periodic surface components obtained from spectrum decomposition.

In the example depicted above, the spectrum 1300 is decomposed into a non-periodic spectrum component 1402 and a periodic spectrum component 1404. The inverse transform of these spectrum components subsequently generate the two site surface images 1502 and 1504 with the non-periodic and periodic characteristics, respectively, as shown in FIG. 15. As shown in this example, it is clear that both non-periodic and periodic surface components can be better characterized after the transformations.

Figure 16:
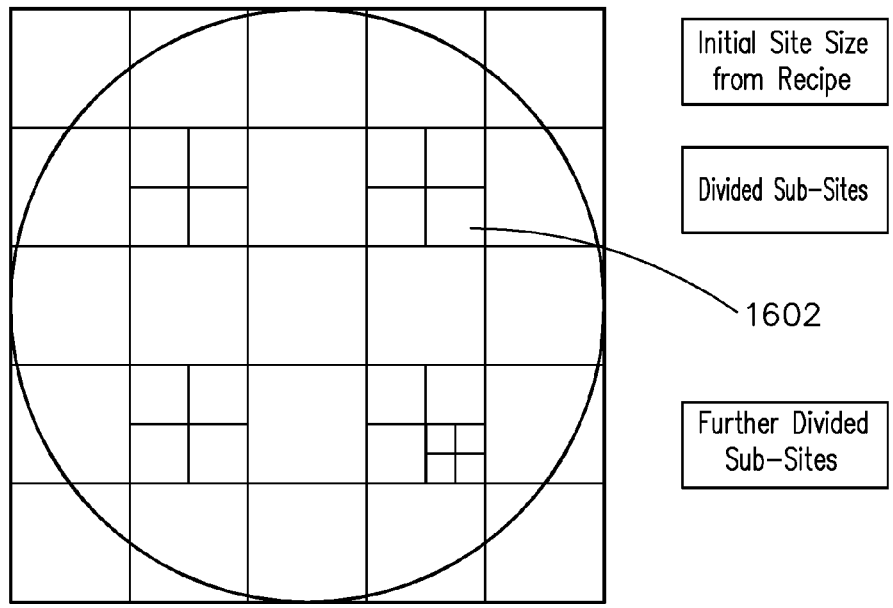
FIG. 16 is an illustration depicting sites and sub-sites for Fourier/Cosine transform analysis.

It is contemplated that in addition to provide more detailed surface structure information, the site based nanotopography method can also be used to reduce the print-through artifacts often observed in the images from interferometry instruments. To achieve this, sub-site regions are utilized in one embodiment to provide further detailed spatial-frequency analysis. In such cases, Fourier and/or Cosine transforms can be carried out from the sub-site regions based on the initial site layout defined by the recipe. For example, if the Fourier and Cosine transforms from an initial site contains several different major frequency components located at different regions in a particular site 1602, that particular site 1602 can be divided into the four sub-site regions as shown in FIG. 16. Dividing a site into multiple sub-site regions provides more spatial localization and frequency information about the features in that particular site 1602. It is contemplated that, depending on the local signal characteristics, this division process can continue recursively for the sub-site regions of interest until a minimum measurement site size is reached.

It is also contemplated that additionally and/or alternatively, step 1110 may perform wavelet transformations to obtain scale-frequency information. More specifically, when performing the Fourier or Cosine transformation on the site image, a fixed frequency resolution is used, and the spatial localization is provided by the site partition and thus limited by the site size. When more flexibility in the surface feature scale control and variable frequency resolution is required, various wavelet transforms can be utilized for the site based nanotopography for the scale-frequency analysis.

Figure 17:
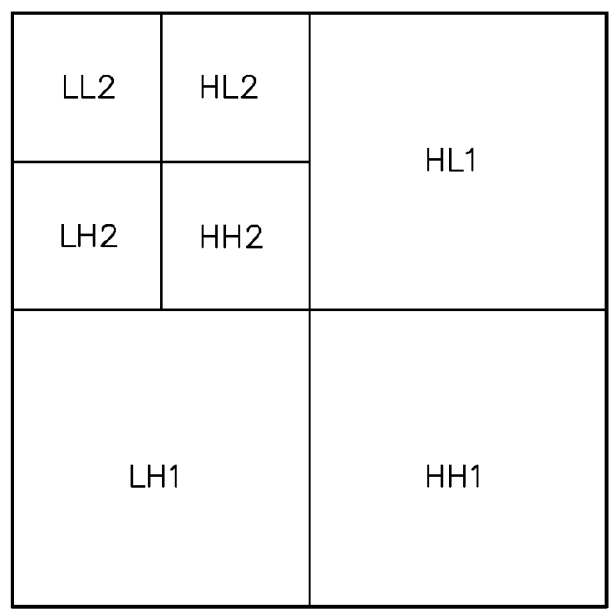
FIG. 17 is an illustration depicting wavelet decomposition of a site image.

As illustrated in FIG. 17, the site image is decomposed into 7 sub-bands in a two level wavelet transform. The signals in these sub-bands provide the information about the scale, frequency and orientation of the surface features in the site image. The wafer surface features will then be characterized in both the scale and frequency space for more informative feature characteristics. More information analysis can be carried out in wavelet quad-tree for the site images, which can be recursively constructed by decomposing each original frequency quadrant into squares of progressively smaller image sizes.

From these scale and frequency distributions in the scale-frequency bands, many useful feature metrics can be defined and calculated, such as the magnitudes or energy of the features with given scales and frequencies. Since both the spatial and frequency properties of surface features are revealed in the wavelet transform, better feature detection and classification can be carried out in the wavelet transform domain than in the spatial or the Fourier transform domain alone.

For example, the improved performance for separating the isolated surface scratches from the fine line-like polishing marks can be obtained in wavelet transform domain by analyzing the wavelet transform coefficients at different scales to identify local oscillation patterns from the polishing marks. In another example, oriented two-dimensional wavelet transforms in the site based nanotopography can be used to process the filtered site images to further localize the surface texture regions over neighborhoods of varying sizes and define the region boundaries of homogeneous texture regions. This texture analysis can generate valuable analysis results for the wafer and process control.

While the examples above depicted uniform site partitions, non-uniform site partitions can also be used for advanced wafer surface nanotopography analysis. The boundaries of the sites may be defined by the wafer image segmentation according to the local image characteristics. These non-uniform sites may have different areas in general while still maintaining their rectangular shape. The best wavelet basis functions can be selected for each spatial segment to provide improved spatial frequency analysis of the surface features in the site.

Together with the site based Fourier/Cosine transforms, the wavelet transform based wafer surface analysis will be able to provide useful information about the surface roughness and textures, and thus further expand the capability of the wafer surface nanotopography analysis presented in accordance with the present disclosure.

Furthermore, related to the image transform domain metric calculation described above, it is contemplated that the periodic signal components in the Fourier transform domain can be identified and extracted for their measurement or suppressed for the measurement of non-periodic surface structures. The process of suppressing the periodic signal components for the measurement of non-periodic surface structures is referred to as the pattern structure suppression technique in accordance with the present disclosure.

Figure 18:
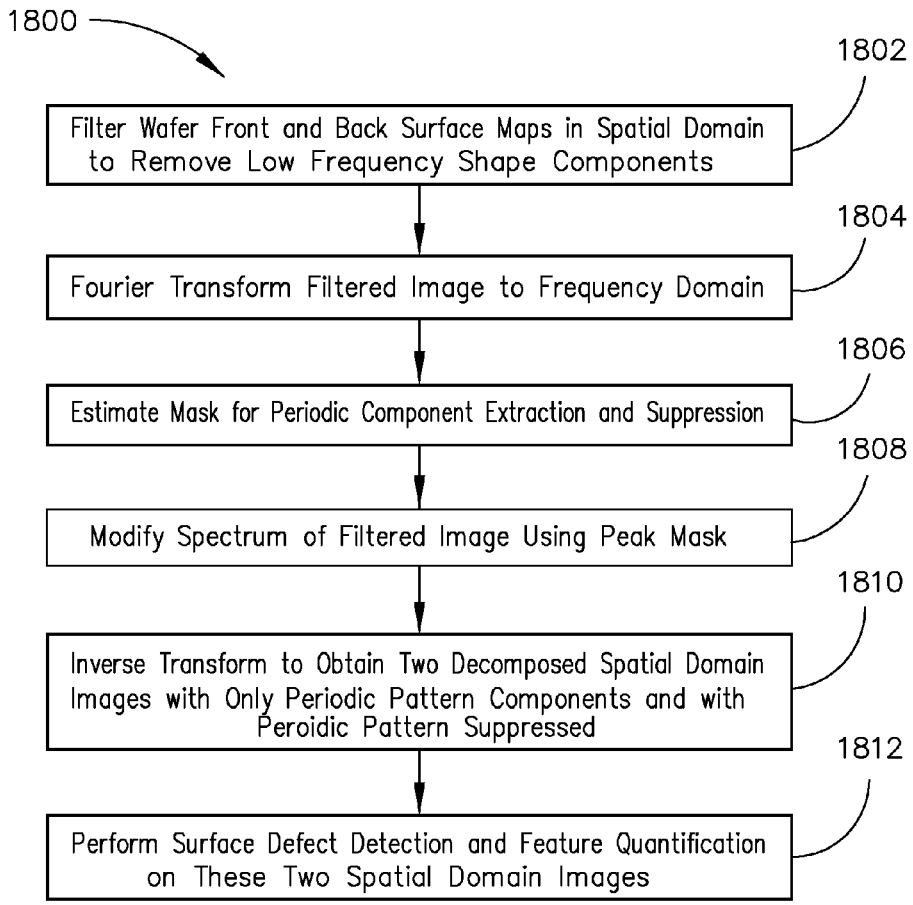
FIG. 18 is a flow diagram illustrating a pattern structure suppression technique in accordance with one embodiment of the present disclosure.

FIG. 18 is a flow diagram illustrating major steps of the pattern structure suppression technique in accordance with one embodiment of the present disclosure. As shown in FIG. 18, after step 1802 filters the wafer front and back surface maps in spatial domain to remove low frequency shape components, step 1804 may Fourier transform the filtered image to the frequency domain. Step 1806 may then estimate mask for periodic component extraction and suppression, and the peak mask may be utilized to modify the spectrum of the filtered image in step 1808. Step 1810 may inverse transform the modified spectrum to obtain two decomposed spatial domain images. One of the decomposed spatial domain images may contain only periodic pattern components (i.e., pattern structure image) while the other may contain the wafer image with periodic pattern suppressed (i.e., pattern suppressed background image).

It is noted that the pattern extraction/suppression process described above are carried out in the whole wafer image and then the measurement sites can be defined on the pattern structure image and/or the pattern suppressed background image for site-based nanotopography measurements performed in step 1812. It is contemplated that suppressing the pattern structures in the filtered image maps allows the surface defects and other surface features to be better revealed and quantified. Therefore, it is contemplated that the pattern structure suppression technique 1800 may be included as an optional process step in the site based nanotopography methods 100 and/or 1100 described above.

Figure 19:
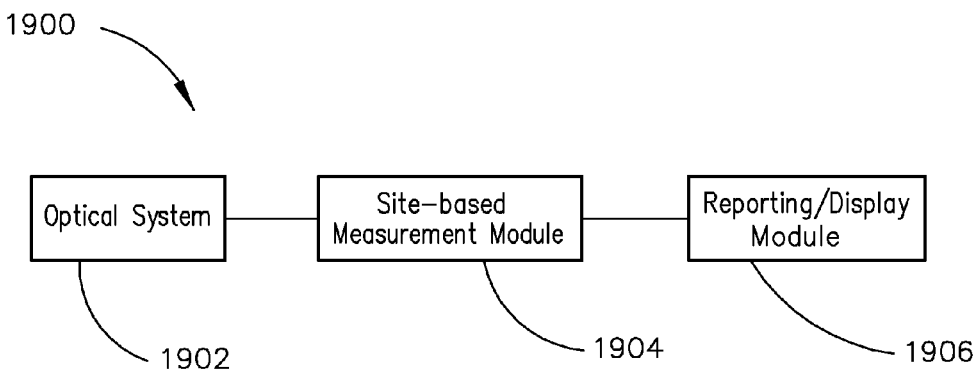
FIG. 19 is a block diagram illustrating a system for providing site-based nanotopography in accordance with the present disclosure.

FIG. 19 is a block diagram depicting a site-based nanotopography system 1900 in accordance with the present disclosure. The site-based nanotopography system 1900 includes an optical system 1902 configured for obtaining a wafer surface image. As previously described, the optical system 1902 may acquire the wafer surface images directly utilizing wafer dimensional geometry tools such as the WaferSight metrology system from KLA-Tencor. Alternatively, the wafer shape image, wafer front and back surface shape images or the like may also be constructed indirectly using other metrology tools as well.

The site-based nanotopography system 1900 also includes a site based measurement module 1904 in communication with the optical system 1902. The site based measurement module 1904 is configured for carrying out the site based nanotopography method 100 or 1100 as described above. The metric values calculated may subsequently be reported to users via a reporting/display module 1906 as previously described.

It is contemplated that while the examples above referred to wafer metrology measurements, the systems and methods in accordance with the present disclosure are applicable to other types of polished plates as well without departing from the spirit and scope of the present disclosure. The term wafer used in the present disclosure may include a thin slice of semiconductor material used in the fabrication of integrated circuits and other devices, as well as other thin polished plates such as magnetic disc substrates, gauge blocks and the like.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A method for inspecting a wafer, comprising:
   defining a wafer partitioning scheme;
   obtaining a wafer surface image;
   filtering the wafer surface image to remove a low frequency surface components;
   performing wafer edge treatment on the wafer surface image to suppress a strong filter response from a sharp wafer edge roll-off or data discontinuity created by edge exclusion operation;
   normalizing filter response present on the wafer surface image;
   partitioning the wafer surface image into a plurality of measurement sites according to the wafer partitioning scheme;
   calculating a metric value for each of the plurality of measurement sites based on the filtered wafer surface image; and
   reporting the metric value calculated for each of the plurality of measurement sites in a graphical representation.

2. The method of claim 1, further comprising:
   reporting the plurality of measurement metrics calculated for each of the plurality of measurement sites in a measurement result file.

3. The method of claim 1, wherein the wafer partitioning scheme is a Cartesian grid partition scheme, the Cartesian grid partition scheme partitions the measurement sites into a plurality of uniform rectangular site areas.

4. The method of claim 1, wherein the wafer partitioning scheme is a polar grid partition scheme.

5. The method of claim 1, wherein defining a wafer partitioning scheme further includes defining at least one of:
   a pixel size for different pixel sizes of the surface image;
   a site array defined by site width and a site height, and the site X/Y offsets;
   a polar array defined by the number of sectors and zones;
   edge exclusion for the wafer edge mask;
   filtering for choosing different filters used for the removal of low frequency surface components;
   output for specifying a type of metrics for a site based surface analysis; and
   masks for excluding certain areas of the wafer surface in the site metric calculation.

6. The method of claim 1, wherein filtering the wafer surface image further includes utilizing a plurality of filters to remove a plurality of low frequency surface components.

7. The method of claim 1, further comprising:
   classifying the plurality of measurement sites according to at least one of: a manually set threshold or an automatically determined threshold; and
   reporting the classification results in at least one of: a graphical representation or a classification result file.

8. The method of claim 7, wherein classifying the plurality of measurement sites further includes classifying at least one of: a dimple, a pit, a wafer edge crown, a scratch, and a slipline.

9. The method of claim 1, wherein filtering the wafer surface image utilizes filters selected from at least one of: a Laplace filter, a Sobel filter, and a Difference of Gaussian (DOG) filter.

10. The method of claim 1, wherein performing wafer edge treatment on the wafer surface image further includes:
    converting the wafer edge region into a polar space;
    performing a one-dimensional median filtering along a tangential direction row by row;
    subtracting a filtered image from a original image to obtain a edge response suppressed image; and
    performing a polarity trimmed mean on the edge treated image in the edge band region.

11. The method of claim 1, wherein normalizing filter response present on the wafer surface image further includes normalizing a plurality of filter kernel coefficients from a plurality of maximum magnitude frequency responses.

12. The method of claim 1, wherein normalizing filter response present on the wafer surface image further includes normalizing a plurality of filter kernel coefficients from the response to the point or line input signals.

13. The method of claim 1, further comprising:
suppressing pattern structures in the filtered wafer surface image prior to partitioning the wafer surface image into the plurality of measurement sites.

14. The method of claim 13, wherein suppressing pattern structures in the filtered wafer surface image further includes:
transforming the filtered wafer surface image to a frequency domain using Fourier transform;
identifying periodic signal components in the Fourier transform domain; and
suppressing the periodic signal components in the filtered wafer surface image.

15. A method for inspecting a wafer, comprising:
defining a wafer partitioning scheme;
obtaining a wafer surface image;
filtering the wafer surface image to remove a low frequency surface components;
performing wafer edge treatment on the wafer surface image to suppress a strong filter response from a sharp wafer edge roll-off or data discontinuity created by edge exclusion operation;
normalizing filter response present on the wafer surface image;
partitioning the wafer surface image into a plurality of measurement sites according to the wafer partitioning scheme;
performing at least one of: Fourier transform, Cosine transform, or wavelet transform on each of the plurality of measurement sites;
calculating a metric value for each of the plurality of measurement sites based on the transformed wafer surface image; and
reporting the metric value calculated for each of the plurality of measurement sites in a graphical representation.

16. The method of claim 15, further comprising:
reporting the plurality of measurement metrics calculated for each of the plurality of measurement sites in a measurement result file.

17. The method of claim 15, wherein the wafer partitioning scheme is a Cartesian grid partition scheme, the Cartesian grid partition scheme partitions the measurement sites into a plurality of uniform rectangular site areas.

18. The method of claim 15, wherein the wafer partitioning scheme is a polar grid partition scheme.

19. The method of claim 15, wherein defining a wafer partitioning scheme further includes defining at least one of:
a pixel size for different pixel sizes of the surface image;
a site array defined by site width and a site height, and the site X/Y offsets;
a polar array defined by the number of sectors and zones;
edge exclusion for the wafer edge mask;
filtering for choosing different filters used for the removal of low frequency surface components;
output for specifying a type of metrics for a site based surface analysis; and
masks for excluding certain areas of the wafer surface in the site metric calculation.

20. The method of claim 15, wherein filtering the wafer surface image further includes utilizing a plurality of filters to remove a plurality of low frequency surface components.

21. The method of claim 15, wherein filtering the wafer surface image utilizes filters selected from at least one of: a Laplace filter, a Sobel filter, and a Difference of Gaussian (DOG) filter.

22. The method of claim 15, wherein performing wafer edge treatment on the wafer surface image further includes:
converting the wafer edge region into a polar space;
performing a one-dimensional median filtering along a tangential direction row by row;
subtracting a filtered image from a original image to obtain a edge response suppressed image; and
performing a polarity trimmed mean on the edge treated image in the edge band region.

23. The method of claim 15, wherein normalizing filter response present on the wafer surface image further includes normalizing a plurality of filter kernel coefficients from a plurality of maximum magnitude frequency responses.

24. The method of claim 15, wherein normalizing filter response present on the wafer surface image further includes normalizing a plurality of filter kernel coefficients from the response to the point or line input signals.

25. The method of claim 15, further comprising:
suppressing pattern structures in the filtered wafer surface image prior to partitioning the wafer surface image into the plurality of measurement sites.

26. The method of claim 25, wherein suppressing pattern structures in the filtered wafer surface image further includes:
transforming the filtered wafer surface image to a frequency domain using Fourier transform;
identifying periodic signal components in the Fourier transform domain; and
suppressing the periodic signal components in the filtered wafer surface image.

27. A wafer inspection system, comprising:
an optical system configured for obtaining a wafer surface image of the given wafer; and
a site based measurement module in communication with the optical system, the site based measurement module configured for:
receiving a wafer partitioning scheme;
filtering the wafer surface image to remove a low frequency surface components;
performing wafer edge treatment on the wafer surface image to suppress a strong filter response from a sharp wafer edge roll-off or data discontinuity created by edge exclusion operation;
normalizing filter response present on the wafer surface image;
partitioning the wafer surface image into a plurality of measurement sites according to the wafer partitioning scheme;
calculating a metric value for each of the plurality of measurement sites based on the filtered wafer surface image; and
reporting the metric value calculated for each of the plurality of measurement sites in a graphical representation.

28. The wafer inspection system of claim 27, wherein the site based measurement module is further configured for:
reporting the plurality of measurement metrics calculated for each of the plurality of measurement sites in a measurement result file.

29. The wafer inspection system of claim 27, wherein the wafer partitioning scheme is a Cartesian grid partition scheme, the Cartesian grid partition scheme partitions the measurement sites into a plurality of uniform rectangular site areas.

30. The wafer inspection system of claim 27, wherein the wafer partitioning scheme is a polar grid partition scheme.

31. The wafer inspection system of claim 27, wherein defining a wafer partitioning scheme further includes defining at least one of:
a pixel size for different pixel sizes of the surface image;

a site array defined by site width and a site height, and the site X/Y offsets;
a polar array defined by the number of sectors and zones;
edge exclusion for the wafer edge mask;
filtering for choosing different filters used for the removal of low frequency surface components;
output for specifying a type of metrics for a site based surface analysis; and
masks for excluding certain areas of the wafer surface in the site metric calculation.

32. The wafer inspection system of claim 27, wherein filtering the wafer surface image further includes utilizing a plurality of filters to remove a plurality of low frequency surface components.

33. The wafer inspection system of claim 27, wherein the site based measurement module is further configured for:
classifying the plurality of measurement sites according to at least one of: a manually set threshold or an automatically determined threshold; and
reporting the classification results in at least one of: a graphical representation or a classification result file.

34. The wafer inspection system of claim 33, wherein classifying the plurality of measurement sites further includes classifying at least one of: a dimple, a pit, a wafer edge crown, a scratch, and a slipline.

35. The wafer inspection system of claim 27, wherein filtering the wafer surface image utilizes filters selected from at least one of: a Laplace filter, a Sobel filter, and a Difference of Gaussian (DOG) filter.

36. The wafer inspection system of claim 27, wherein performing wafer edge treatment on the wafer surface image further includes:
converting the wafer edge region into a polar space;
performing a one-dimensional median filtering along a tangential direction row by row;
subtracting a filtered image from a original image to obtain a edge response suppressed image; and
performing a polarity trimmed mean on the edge treated image in the edge band region.

37. The wafer inspection system of claim 27, wherein normalizing filter response present on the wafer surface image further includes normalizing a plurality of filter kernel coefficients from a plurality of maximum magnitude frequency responses.

38. The wafer inspection system of claim 27, wherein normalizing filter response present on the wafer surface image further includes normalizing a plurality of filter kernel coefficients from the response to the point or line input signals.

39. The wafer inspection system of claim 27, wherein the site based measurement module is further configured for:
suppressing pattern structures in the filtered wafer surface image prior to partitioning the wafer surface image into the plurality of measurement sites.

40. The wafer inspection system of claim 39, wherein suppressing pattern structures in the filtered wafer surface image further includes:
transforming the filtered wafer surface image to a frequency domain using Fourier transform;
identifying periodic signal components in the Fourier transform domain; and
suppressing the periodic signal components in the filtered wafer surface image.

41. A wafer inspection system, comprising:
an optical system configured for obtaining a wafer surface image of the given wafer; and
a site based measurement module in communication with the optical system, the site based measurement module configured for:
receiving a wafer partitioning scheme;
filtering the wafer surface image to remove a low frequency surface components;
performing wafer edge treatment on the wafer surface image to suppress a strong filter response from a sharp wafer edge roll-off or data discontinuity created by edge exclusion operation;
normalizing filter response present on the wafer surface image;
partitioning the wafer surface image into a plurality of measurement sites according to the wafer partitioning scheme;
performing at least one of: Fourier transform, Cosine transform, or wavelet transform on each of the plurality of measurement sites;
calculating a metric value for each of the plurality of measurement sites based on the transformed wafer surface image; and
reporting the metric value calculated for each of the plurality of measurement sites in a graphical representation.

42. The wafer inspection system of claim 41, wherein the site based measurement module is further configured for:
reporting the plurality of measurement metrics calculated for each of the plurality of measurement sites in a measurement result file.

43. The wafer inspection system of claim 41, wherein the wafer partitioning scheme is a Cartesian grid partition scheme, the Cartesian grid partition scheme partitions the measurement sites into a plurality of uniform rectangular site areas.

44. The wafer inspection system of claim 41, wherein the wafer partitioning scheme is a polar grid partition scheme.

45. The wafer inspection system of claim 41, wherein defining a wafer partitioning scheme further includes defining at least one of:
a pixel size for different pixel sizes of the surface image;
a site array defined by site width and a site height, and the site X/Y offsets;
a polar array defined by the number of sectors and zones;
edge exclusion for the wafer edge mask;
filtering for choosing different filters used for the removal of low frequency surface components;
output for specifying a type of metrics for a site based surface analysis; and
masks for excluding certain areas of the wafer surface in the site metric calculation.

46. The wafer inspection system of claim 41, wherein filtering the wafer surface image further includes utilizing a plurality of filters to remove a plurality of low frequency surface components.

47. The wafer inspection system of claim 41, wherein filtering the wafer surface image utilizes filters selected from at least one of: a Laplace filter, a Sobel filter, and a Difference of Gaussian (DOG) filter.

48. The wafer inspection system of claim 41, wherein performing wafer edge treatment on the wafer surface image further includes:
converting the wafer edge region into a polar space;
performing a one-dimensional median filtering along a tangential direction row by row;
subtracting a filtered image from a original image to obtain a edge response suppressed image; and performing a polarity trimmed mean on the edge treated image in the edge band region.

49. The wafer inspection system of claim 41, wherein normalizing filter response present on the wafer surface image further includes normalizing a plurality of filter kernel coefficients from a plurality of maximum magnitude frequency responses.

50. The wafer inspection system of claim 41, wherein normalizing filter response present on the wafer surface image further includes normalizing a plurality of filter kernel coefficients from the response to the point or line input signals.

51. The wafer inspection system of claim 41, wherein the site based measurement module is further configured for:
   suppressing pattern structures in the filtered wafer surface image prior to partitioning the wafer surface image into the plurality of measurement sites.

52. The wafer inspection system of claim 51, wherein suppressing pattern structures in the filtered wafer surface image further includes:
   transforming the filtered wafer surface image to a frequency domain using Fourier transform;
   identifying periodic signal components in the Fourier transform domain; and
   suppressing the periodic signal components in the filtered wafer surface image.

\* \* \* \* \*